July 5, 1932.                    B. PALMER                    1,865,882
                               ARMORED VEHICLE
                      Filed Aug. 19, 1931     2 Sheets-Sheet 1
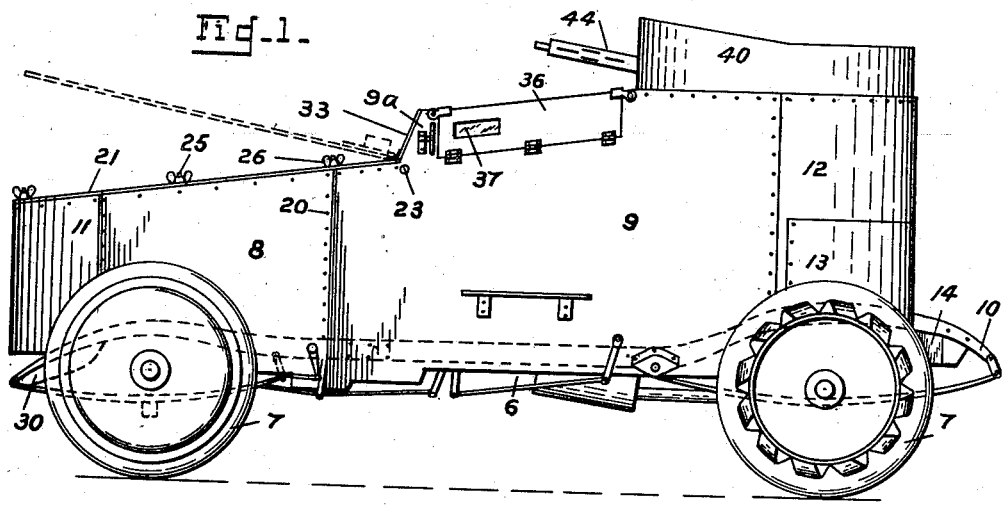
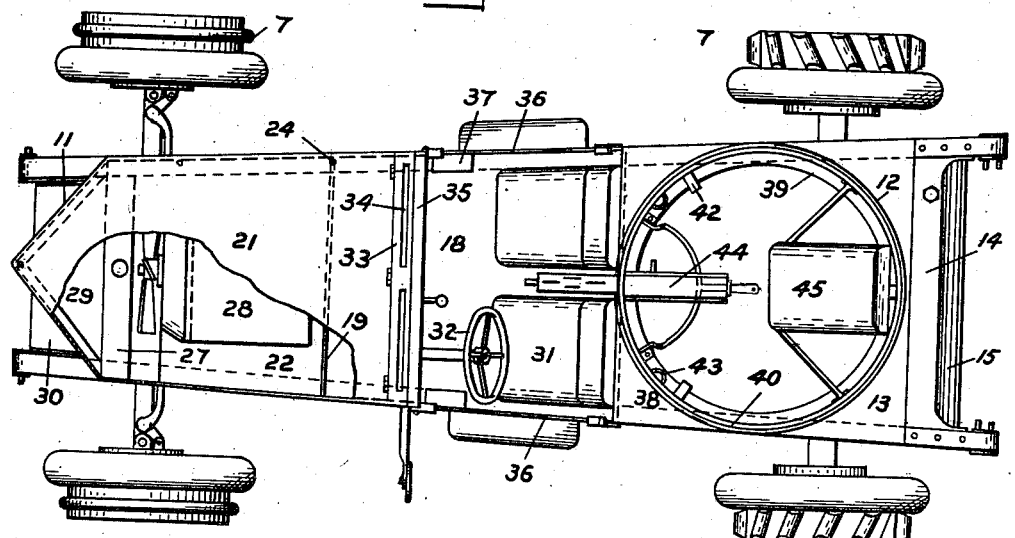
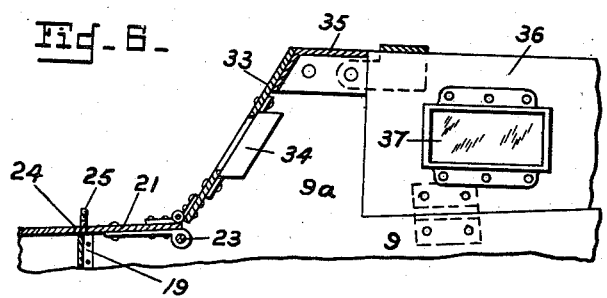
INVENTOR.
Bruce Palmer
BY W. N. Roach
ATTORNEY July 5, 1932.  B. PALMER  1,865,882
ARMORED VEHICLE
Filed Aug. 19, 1931   2 Sheets-Sheet 2
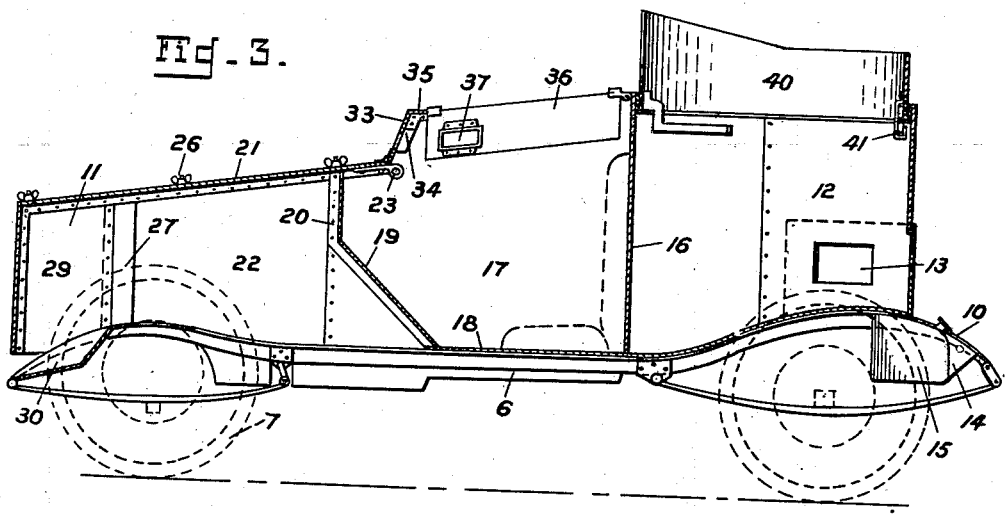
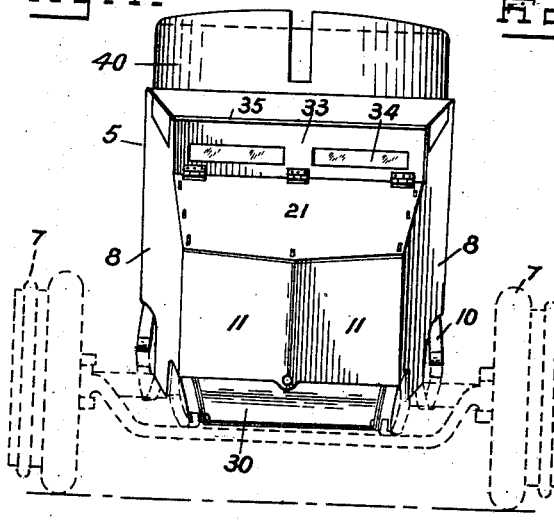
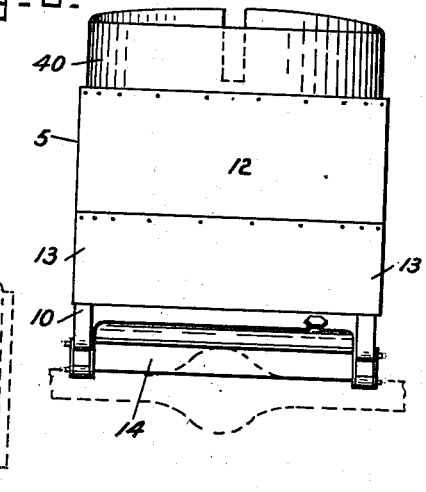
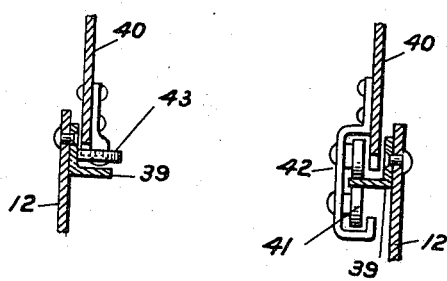
INVENTOR.
Bruce Palmer
BY W. N. Roach
ATTORNEY

Patented July 5, 1932

1,865,882

UNITED STATES PATENT OFFICE

BRUCE PALMER, OF THE UNITED STATES ARMY, FORT RILEY, KANSAS

ARMORED VEHICLE

Application filed August 19, 1931. Serial No. 558,047.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to an armored vehicle.

The armoring of automobiles has generally been conducted for the sole purpose of providing protection by applying armor plate over or in lieu of the body of the vehicle. Such adaptations, as a rule, do not materially alter the general outline of the commercial body nor do they vary its travel characteristics by adapting it for movement across country.

As distinguished from this type of armored automobile, the vehicle of the present invention, though designed for utilization of a commercial chassis without alterations, is particularly developed and arranged to embody such characteristics as will eminently adapt and qualify it to serve as a conveyance in military operations which heretofore have been conducted with cavalry. It is provided with armor as a protection against small arms bullets, but inasmuch as any light armored vehicle is vulnerable to artillery fire, reliance for its protection from this class of weapons is placed on its speed across country and its small size and low mounting which cooperate to reduce its visibility and render it a difficult target.

In addition to the design of the body which exactly follows the frame of a standard automobile chassis, the vehicle is distinguished by a novel arrangement of the compartments for the driver and gunner, by a provision whereby a vision shield is hinged to a cover plate of the motor which is pivoted on a transverse body brace, and by means for directing air through the radiator.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the vehicle forming the subject of the invention;

Fig. 2 is a plan view thereof, the cover plate of the motor compartment being broken away;

Fig. 3 is a longitudinal sectional view through the vehicle;

Figs. 4 and 5 are respectively views in front and rear elevation;

Fig. 6 is a fragmentary enlarged longitudinal sectional view through the vision shield;

Figs. 7 and 8 are detail sectional views through the turret mounting.

Referring to the drawings by numerals of reference:

The vehicle comprises a body 5 mounted on a commercial automobile chassis 6 whose wheels each carry a supplemental traction device 7 normally spaced from the ground and especially designed for cross country travel. The application of the traction device 7, while not novel, affords an employment of the vehicle which materially affects and is reflected in the design and arrangement of the body 5.

The body is formed of armor plate and consists essentially of two vertical side plates 8 and 9 secured to each other and to each of the rearwardly diverging frames 10 of the chassis, a vertically disposed angled front plate 11 connecting the plates 8, and a vertically disposed, semi-cylindrical rear plate 12 connecting the plates 9. A pair of boxes 13, each secured to a side of the rear plate 12 and to one of the frames 10 meet a transverse plate 14 overlying the fuel tank 15.

The rear plate 12 being thus secured to each of the frames 10 of the chassis provides rigidity of the side plates 9. Rigidity is additionally obtained for the intermediate portions of the body 5 by having a partition 16 (Fig. 3) defining the rear of the driver's compartment 17 secured to the floor 18 while forwardly in the body a dash plate 19 is provided which may be conveniently secured by the bolts or rivets 20 serving to unite the meeting edges of the side plates 8 and 9. The dash plate extends to the floor 18 and its upper edge is flush with the upper edges of the side plates so that when a flat cover 21 for the engine compartment 22 is in place the dash plate will serve as a partition between this compartment and the driver's compartment 17.

The cover 21 is pivotally mounted on a rod 23 extending transversely of and bracing the side plates 9 in rear of the dash plate. The cover conforms exactly to the shape of the forward portion of the body which it overlies and is provided marginally with apertures 24 which receive bolts 25 fixed on the upper edge of the side plates 8 and the front angle plate 11. The cover is secured by means of nuts 26. When in closed position it is in contact with the dash plate 19 and also with a radiator 27 forwardly of the engine 28 and fitting between the side plates 8. The cover cooperates with the front angle plate 11 to provide forwardly of the radiator an air chamber 29, the entry for which is established by a deflecting plate or scoop 30 spaced from the lower edge of the angle plate. As a consequence of this structure all of the air available will be obliged to pass through the radiator and over the engine.

The seat 31 for the driver is placed on the floor 18 and the steering mechanism 32 is accordingly shortened. From this position, the driver, when seated, can look over the cover 21. A rearwardly inclined shield 33 having windows 34 of bullet-proof glass is hinged to the cover 21 and fits in a frame formed by upstanding portions 9a of the side plates 9 and a cross piece 35. The shield may be secured in the raised position in any convenient manner and when lowered onto the cover will not interfere with the vision of the driver.

At each side of the driver's compartment the side plates 9 include a hinged shield 36 having a window 37 and arranged to swing outwardly on being lowered.

Secured to the upper portion of the semi-cylindrical rear plate 12 and to a transom 38 in rear of the partition 16 is a base ring 39 on which a turret 40 is supported through rollers 41 carried by hangars 42. The turret is guided by means of horizontal rollers 43. The turret carries a gun or guns 44 and a suspended seat 45 for the gunner. In order to save in weight the turret and driver's compartment are not provided with overhead protection.

From the foregoing it will be seen that while adhering to the general conformation suggested by the commercial chassis frame in so far as lateral dimensions are concerned, a body has been provided whose sides and top are favorably disposed for the deflection of bullets. By thus affording the greatest protection consistent with the thickness of the armor, the outer weight of the body has been kept within the allowance and distribution prescribed for the commercial body of the particular chassis used.

The elements entering into the formation of the body are either items carried in stock for commercial purposes or readily fabricated and this feature, coupled with the adaptation of the body to a standard chassis will facilitate protection in an emergency.

I claim:

1. In a motor vehicle, a chassis having rearwardly diverging frames, an armored body comprising vertical side plates secured to the frames, an angled plate connecting the front ends of the side plates, a semi-cylindrical plate connecting the rear ends of the side plates, a radiator fitted between the side plates in front of the motor, a partition between the side plates in rear of the motor, a floor in rear of the partition, a front seat on the floor, a rod connecting the side plates in rear of the partition, a flat cover hinged on the rod and covering the body forwardly thereof, said cover when lowered engaging the upper edge of both the radiator and the partition, means underneath the angled front plate for directing air to the radiator, a windowed shield hinged to the rear of the cover, a frame for said shield formed by joining the side plates, a windowed shield hinged to each side plate adjacent the front seat, a transom in rear of the front seat, a base ring carried by the transom and semi-cylindrical plate and a turret mounted on the base ring.

2. In a motor vehicle, a chassis having frames, an armored body comprising vertical side plates secured to the frames, an angled plate connecting the front ends of the side plates, a semi-cylindrical plate connecting the rear ends of the side plates, a radiator fitted between the side plates in front of the motor, a partition between the side plates in rear of the motor, a floor in rear of the partition, a rod connecting the side plates in rear of the partition, a flat cover hinged on the rod and covering the body forwardly thereof, said cover when lowered engaging the upper edge of both the radiator and the partition, means underneath the angled front plate for directing air to the radiator, a transom in rear of the front seat, a base ring carried by the transom and semi-cylindrical plate and a turret mounted on the base ring.

3. In a motor vehicle, a chassis having frames, an armored body comprising vertical side plates secured to the frames, an angled plate connecting the front ends of the side plates, a semi-cylindrical plate connecting the rear ends of the side plates, a radiator fitted between the side plates in front of the motor, a partition between the side plates in rear of the motor, a floor in rear of the partition, a rod connecting the side plates in rear of the partition, a flat cover hinged on the rod and covering the body forwardly thereof, said cover when lowered engaging the upper edge of both the radiator and the partition and means underneath the angled front plate for directing air to the radiator.

4. In a motor vehicle, a chassis having rearwardly diverging frames, an armored body on the frames comprising side plates secured vertically thereto, a vertically disposed angled front plate connecting the front ends of the side plates, a semi-cylindrical plate connecting the rear ends of the side plates, a box secured to the rear extremity of each frame and to the semi-cylindrical plate, a pair of partitions transversely bracing the side plates and defining a driver's and a gunner's compartment, and a cover for the forward portion of the vehicle hingedly mounted in rear of the foremost partition.

5. In a motor vehicle, a chassis having rearwardly diverging frames, an armored body on the frames comprising side plates secured vertically thereto, a vertically disposed angled front plate connecting the front ends of the side plates, a semi-cylindrical plate connecting the rear ends of the side plates, a pair of partitions transversely bracing the side plates and defining a driver's and a gunner's compartment, and a cover for the forward portion of the vehicle.

6. In a motor vehicle, a chassis, an armored body including side plates secured vertically to the frame of the chassis, an angled front plate connecting the front ends of the side plates, a radiator and a partition fitted between and flush with the tops of the side plates and defining a motor compartment, a rod connecting the side plates in rear of the partition, a flat cover hinged on the rod and covering the body forwardly thereof, said cover when lowered engaging the upper edge of the radiator and partition, a windowed shield hinged to the rear of the cover, a frame for said shield formed by joining the side plates, and means underneath the angled front plate for directing air into the radiator.

7. In a motor vehicle, a chassis, an armored body including side plates secured vertically to the frame of the chassis, a front plate connecting the front ends of the side plates, a radiator and a partition fitted between and flush with the tops of the side plates and defining a motor compartment, a rod connecting the side plates in rear of the partition, a flat cover hinged on the rod and covering the body forwardly thereof, said cover when lowered engaging the upper edge of the radiator and partition, and a windowed shield carried by the cover.

8. In combination with a motor vehicle radiator, side supports for the radiator, a vertically disposed angled plate secured to the side supports, a cover fitting over the radiator and the angled plate, and a scoop providing an air inlet postioned underneath the angled plate.

9. In a vehicle having a side armored engine and driver's compartment, a cover for the engine compartment extending partially over the driver's compartment and hingedly mounted at its rear end, and a vision shield carried on the rear end of the cover.

BRUCE PALMER.